(12) United States Patent
Murray et al.

(10) Patent No.: US 10,832,899 B2
(45) Date of Patent: Nov. 10, 2020

(54) SAMPLE IONISATION USING A PULSED LASER SOURCE

(71) Applicant: Micromass UK Limited, Wilmslow (GB)

(72) Inventors: Paul Murray, Manchester (GB); Mark William Towers, Stockport (GB); Matthew Havard, Warrington (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 16/272,693

(22) Filed: Feb. 11, 2019

(65) Prior Publication Data

US 2019/0252170 A1    Aug. 15, 2019

(30) Foreign Application Priority Data

Feb. 12, 2018 (GB) .................................. 1802234.3

(51) Int. Cl.
*H01J 49/04* (2006.01)
*G01N 27/62* (2006.01)
*H01J 49/16* (2006.01)

(52) U.S. Cl.
CPC ........ *H01J 49/0418* (2013.01); *G01N 27/622* (2013.01); *G01N 27/628* (2013.01); *H01J 49/164* (2013.01)

(58) Field of Classification Search
CPC ... H01J 49/0418; H01J 49/164; G01N 27/628
See application file for complete search history.

(56) References Cited

U.S. PATENT DOCUMENTS

| 2005/0199801 A1* | 9/2005 | Takada ............... G01N 33/0057 250/288 |
| 2005/0236564 A1 | 10/2005 | Keller et al. |
| 2006/0071160 A1* | 4/2006 | Haase .................. H01J 49/164 250/288 |
| 2007/0205358 A1* | 9/2007 | Bunton ................ H01J 37/285 250/282 |
| 2010/0237233 A1 | 9/2010 | Covey et al. |

(Continued)

FOREIGN PATENT DOCUMENTS

EP         1319945 A1      6/2003

OTHER PUBLICATIONS

Combined Search and Examination Report for GB Patent Application No. GB1901719.3, dated Jul. 23, 2019.

(Continued)

*Primary Examiner* — Eliza W Osenbaugh-Stewart

(57) ABSTRACT

A mass and/or ion mobility spectrometer 100 comprises a sample plate 102 that supports a target sample 104. The spectrometer 100 further comprises a laser source 110 that generates a series of laser pulses 112 and a control system 118 that moves a focal point of the laser source 110 substantially continuously across the sample plate 102 such that respective packets of ions are generated by respective laser pulses 112 impinging upon respective locations on the target sample 104. The control system 118 performs plural cycles of ion analysis that each produce a set of spectral data corresponding to one or more of the packets of ions. The spectrometer 100 can provide mass and/or ion mobility spectrometry having increased speed and efficiency.

15 Claims, 9 Drawing Sheets

(56) References Cited

U.S. PATENT DOCUMENTS

2011/0172115 A1* 7/2011 Thompson ............. C08G 69/02
506/9
2014/0117227 A1 5/2014 Fujita

OTHER PUBLICATIONS

Trim, P. J., et al., "Introduction of a 20 kHz Nd:YV04 laser into a hybrid quadrupole time-of-flight mass spectrometer for MALDI-MS imaging", Analytical and Bioanalytical Chemistry, 397:3409-3419 (2010).

Potocnik, N. O., et al., "Use of advantageous, volatile matrices enabled by next-generation high-speed matrix-assisted laser desorption/ionization time-of-flight imaging employing a scanning laser beam", Rapid Communications in Mass Spectrometry, 29:2195-2203 (2015).

Search Report for GB Application No. GB1802234.3 dated Jul. 31, 2018.

Porta T., et al., "Quantification in MALDI-MS imaging: what can we learn from MALDI-selected reaction monitoring and what can we expect for imaging?", Analytical and Bioanalytical Chemistry, 407:2177-2187, 2015.

Wiegelmann M., et al., "Influence of the Laser Spot Size, Focal Beam Profile, and Tissue Type on the Lipid Signals Obtained by MALDI-MS Imaging in Oversampling Mode," Journal of the American Society for Mass Spectrometry, 27:1952-1964, 2016.

\* cited by examiner ical to mass and/or ion mobility spectrometers and in particular to mass and/or ion mobility spectrometry comprising ionisation using a pulsed laser source.

SAMPLE IONISATION USING A PULSED LASER SOURCE

CROSS-REFERENCE TO RELATED APPLICATIONS

This application claims priority from and the benefit of United Kingdom patent application No. 1802234.3 filed on Feb. 12, 2018.

FIELD OF THE INVENTION

The present invention relates generally to mass and/or ion mobility spectrometers and in particular to mass and/or ion mobility spectrometry comprising ionisation using a pulsed laser source.

BACKGROUND

Matrix Assisted Laser Desorption Ionisation ("MALDI") mass spectrometry is a process which is particularly suited for the analysis of non-volatile biomolecules. A suitable matrix material such as an organic solvent is added to a sample so that the sample becomes embedded in the matrix material. The embedded sample is then positioned on a metal plate and a laser pulse is directed on to the target sample.

The laser pulse impinging upon the target sample causes analyte material to be ablated and desorbed from the target sample. Analyte ions are generated by analyte material being protonated or deprotonated in the hot plume of gaseous molecules which are released from the target.

The matrix has a strong absorption at the wavelength of the laser pulse and acts as a proton source to encourage ionisation of the analyte. The gaseous plume which is released from the target comprises a mixture of analyte ions together with neutral particles. The mixture of analyte ions and neutral particles is then directed towards the inlet of a mass spectrometer. The analyte ions are separated from the neutral particles with the analyte ions being onwardly transmitted to a mass analyser of the mass spectrometer in order to be mass analysed.

Matrix Assisted Laser Desorption Ionisation mass spectrometry imaging ("MALDI-MSI") involves analysing the distribution of biomolecules across the surface of a target, such as a tissue embedded in a matrix, by scanning the target with a focused laser beam and recording the ion profile at each irradiated pixel. This typically comprises firing a laser pulse at a first sample location, moving the focal point of the laser to a second sample location, and then firing a laser pulse at the second sample location, and so on, in a stop-start manner. An image of the mass spectral properties of the target across the surface of the target can then be constructed. However, in the known arrangements, moving the focal point of the laser in a stop-start manner can be time consuming and inefficient since this requires the focal point of the laser to be decelerated and then accelerated many times over.

It is desired to provide an improved mass and/or ion mobility spectrometer and method of mass and/or ion mobility spectrometry.

SUMMARY

According to an aspect there is provided a mass and/or ion mobility spectrometer comprising:

a sample plate arranged and adapted to support a target sample;

a laser source arranged and adapted to generate a series of laser pulses; and a control system arranged and adapted to:

move a focal point of the laser source substantially continuously across the sample plate, wherein respective packets of ions are generated by respective laser pulses impinging upon respective locations on the target sample supported on the sample plate; and perform plural cycles of ion analysis, wherein each cycle of ion analysis comprises producing a set of spectral data that corresponds to one or more of the packets of ions.

In embodiments, providing a laser source that generates a series of laser pulses and moving a focal point of the laser source substantially continuously (such as over plural cycles of ion analysis) can help to increase the speed and efficiency of the spectrometry being performed. For example, moving the focal point substantially continuously (that is substantially without stopping) can reduce or avoid the need to decrease the velocity of the focal point substantially to zero at a first sample location, pulse the laser to generate a packet of ions at that first sample location, and then increase the velocity of the focal point again to move to the next sample location, and so on, in a substantially stop-start manner. Embodiments can therefore provide for quick and efficient mass and/or ion mobility spectrometry.

In embodiments, increasing the speed of performing mass and/or ion mobility spectrometry can help to reduce the extent of sublimation of a material, such as a matrix material, from a target sample during the spectrometry. For example, for matrix materials that have a relatively high volatility, such as 2',6'-Dihydroxyacetophenone ("DHA"), use of these matrix materials, in particular under vacuum, may cause the matrix material to rapidly sublimate from the target sample which may reduce sensitivity and contaminate ion optics. As a result of this, the number and/or size of packets of ions that it is possible to acquire from the target sample may be significantly reduced if the spectrometry is not performed relatively quickly and in an optimum manner.

In embodiments, providing a laser source that generates a series of laser pulses and moving a focal point of the laser source substantially continuously can help to reduce or negate the extent of sublimation of a material, such as a matrix material, from a target sample while generating packets of ions and performing cycles of ion analysis corresponding to those packets of ions.

In embodiments, crosstalk may be caused by residual ions from the previous cycle of ion analysis remaining in the spectrometer for the subsequent cycle of ion analysis. In embodiments, the control system may be further arranged and adapted to remove residual ions from the spectrometer in between cycles of ion analysis. Removing residual ions from the spectrometer in this way can help to reduce or avoid crosstalk. Various embodiments can provide for quick and efficient mass and/or ion mobility spectrometry with low crosstalk.

Continuing to pulse the laser in between cycles of ion analysis (for example, whilst removing residual ions from the spectrometer) can mean that packets of ions are still generated in between the cycles of ion analysis, and these packets of ions can cause crosstalk and/or cause target sample to be wasted. For example, one or more packets of ions may be generated and then enter the spectrometer only to then be removed and/or not analysed. This problem is made worse if the inter-cycle time is long, particularly relative to the duration of a cycle of ion analysis.

According to various embodiments, the control system may be arranged and adapted to gate, stop or block the series of laser pulses in between cycles of ion analysis and/or whilst residual ions are being removed from the spectrometer. Gating the series of laser pulses in this way can help to reduce or avoid crosstalk. It has also been identified that gating the series of laser pulses in this way can help to avoid wasting sample, by avoiding the generation of packets of ions that will simply be removed from and/or not analysed by the spectrometer. This in turn can help to increase the number of ions generated for the subsequent cycle of ion analysis. These embodiments can therefore provide for quick and efficient mass and/or ion mobility spectrometry with even lower crosstalk and high sensitivity.

It has also been identified that gating the series of laser pulses in between the cycles of ion analysis and/or while the residual ions are being removed from the spectrometer can help to reduce the extent of sublimation of a material, such as a matrix material, from the target sample. For example, the focal point of the laser source may include, or be surrounded by, a nominally heated region. This nominally heated region can increase the extent of sublimation of a matrix material from the target sample in regions of the target sample that the nominally heated region passes over. Gating the series of laser pulses can reduce any preheating and/or sublimation of regions of the target sample that ions are to be subsequently generated from. This can increase the number of ions generated from those regions for cycles of ion analysis and thereby increase the sensitivity of the mass and/or ion mobility spectrometry.

The sample plate may comprise a metallic sample plate. The sample plate may be mounted to a translation stage. The sample plate may be translatable relative to the focal point of the laser source. The sample plate may be translatable in one or more directions which may be orthogonal.

The target sample may comprise a sample embedded in a matrix material. The matrix material may comprise an organic solvent. The matrix material may comprise 2',6'-Dihydroxyacetophenone ("DHA").

The sample may comprise biomolecules.

The sample may comprise biological tissue.

The target sample may be ionised by a Matrix Assisted Laser Desorption Ionisation ("MALDI") ion source. However, embodiments are not limited only to MALDI ion sources, and can comprise other forms of ion sources in which ions may be generated by a laser pulse impinging upon a target sample.

The laser source may be arranged and adapted to generate a series of laser pulses based on a series of control pulses. The control system may be arranged and adapted to generate and/or receive the series of control pulses.

The series of control pulses may be generated and/or received at a substantially constant frequency, for example over plural cycles of ion analysis. The substantially constant frequency may be in a range 0.1-100 kHz, for example in a range selected from a group consisting of: (i) 0.1-1 kHz; (ii) 1-10 kHz; and (iii) 10-100 kHz. The series of control pulses may be generated and/or received substantially continuously, for example over plural cycles of ion analysis. These embodiments can help to simplify the operation of the spectrometer, for example by avoiding the need for complex and/or expensive laser pulse control circuitry.

The control system may be arranged and adapted to gate, stop or block the series of control pulses in between cycles of ion analysis and/or while residual ions are being removed from the spectrometer so as to generate a gated series of control pulses that are provided to the laser source. The control system may be arranged and adapted to gate, stop or block the series of control pulses based on a status signal that indicates whether or not a cycle of ion analysis and/or residual ion removal is currently being performed. The control system may be arranged and adapted to generate and/or receive the status signal. Gating the series of control pulses may comprise an AND operation that takes the series of control pulses and the status signal as inputs and outputs a gated series of control pulses to the laser source. These embodiments can provide an effective and reliable way to electronically gate the series of laser pulses in between cycles of ion analysis and/or while the residual ions are being removed from the spectrometer.

Thus, the control system may be arranged and adapted to electronically gate the series of pulses, for example by gating a series of control pulses in between cycles of ion analysis and/or while residual ions are being removed from the spectrometer, for example based on a status signal that indicates whether or not a cycle of ion analysis and/or residual ion removal is currently being performed. In these embodiments, the laser source may not emit laser pulses at a substantially constant frequency and/or substantially continuously over plural cycles of ion analysis. However, the laser source may emit laser pulses at a substantially constant frequency and/or substantially continuously during each one of the cycles of ion analysis.

The control system may also or instead be arranged and adapted to mechanically and/or optically gate the series of laser pulses, for example by blocking and/or deflecting the output of the laser source in between cycles of ion analysis and/or while residual ions are being removed from the spectrometer, for example based on a status signal that indicates whether or not a cycle of ion analysis and/or residual ion removal is currently being performed. In these embodiments, the laser source may emit the series of laser pulses at the substantially constant frequency and/or substantially continuously over plural cycles of ion analysis.

The focal point of the laser source may be substantially circular or elliptical. A diameter of the focal point of the laser source may be in a range 1-1000 μm, for example in a range selected from a group consisting of: (i) 1-10 μm; (ii) 10-100 μm; and (iii) 100-1000 μm.

The control system may be arranged and adapted to move the focal point of the laser source across the sample plate by moving the sample plate relative to the majority of the spectrometer. The sample plate may be moved by translation along one or more directions which may be orthogonal to each other. In these embodiments, the focal point may be substantially fixed in space relative to the majority of the spectrometer. The control system may also or instead be arranged and adapted to move the focal point of the laser source across the sample plate by moving the focal point relative to the majority of the spectrometer. The focal point may be moved by moving one or more scanning mirrors for the laser source and/or by moving the laser source itself. In these embodiments, the sample plate may be substantially fixed in space relative to the majority of the spectrometer. However, in general, moving one or more scanning mirrors can introduce distortion and moving the laser source itself can be difficult, and so it is generally better to move the sample plate relative to the majority of the spectrometer instead.

The control system may be arranged and adapted to move a focal point of the laser source across the sample plate at a substantially constant velocity. This can further help to increase speed and efficiency, for example by reducing or avoiding the need to substantially alter the velocity of the focal point. The substantially constant velocity may be in a range 0.1-100 mm/s, for example in a range selected from a group consisting of: (i) 0.1-1 mm/s; (ii) 1-10 mm/s; and (iii) 10-100 mm/s.

In embodiments, a diameter of the focal point of the laser source may be greater than a velocity of the focal point divided by the frequency of the laser pulses, for example such that the area desorbed by a subsequent laser pulse can overlap the area of the target sample desorbed by the previous laser pulse. These embodiments can make more complete use of the target sample. However, in other embodiments, a diameter of the focal point of the laser source may be less than a velocity of the focal point divided by the frequency of the laser pulses, for example such that the area desorbed by a subsequent laser pulse does not overlap the area of the target sample desorbed by the previous laser pulse.

The control system may be arranged and adapted to move the focal point of the laser source along a scan line. The control system may be arranged and adapted to move the focal point of the laser source successively along plural scan lines. The plural scan lines may be substantially parallel to one another. The control system may be arranged and adapted to move the focal point of the laser source successively along plural scan lines in a raster or serpentine manner. Scanning in a serpentine manner can reduce the overall travel time for the focal point. The pitch of the scan lines may be in a range 1-1000 µm, for example in a range selected from a group consisting of: (i) 1-10 µm; (ii) 10-100 µm; and (iii) 100-1000 µm. The pitch of the scan lines may be less than or substantially equal to a diameter of the focal point of the laser source. These embodiments can make more complete use of the target sample. However, in other embodiments, the pitch of the scan lines may be more than a diameter of the focal point of the laser source.

The control system may be arranged and adapted to move the focal point of the laser source from one scan line to the next in between cycles of ion analysis and/or while residual ions are being removed from the spectrometer. The control system may be arranged and adapted to gate the series of laser pulses when moving the focal point of the laser source from one scan line to the next. When moving along a scan line, the movement and/or velocity of the focal point may be substantially continuous and/or substantially constant. However, when moving the focal point of the laser source from one scan line to the next, the movement and/or velocity of the focal point may not be continuous and/or constant.

The duration of each cycle of ion analysis may be in a range 1-1000 ms, for example in a range selected from the group consisting of: (i) 1-10 ms; (ii) 10-100 ms; and (iii) 100-1000 ms. The interval between respective cycles of ion analysis may be in a range 1-1000 ms, for example in a range selected from the group consisting of: (i) 1-10 ms; (ii) 10-100 ms; and (iii) 100-1000 ms.

A set of spectral data generated for a cycle of ion analysis may correspond to one or more laser pulses and/or packets of ions. The number of laser pulses and/or packets of ions generated for a cycle of ion analysis and/or for a set of spectral data may be in a range 1-1000, for example in a range selected from the group consisting of: (i) 1-10; (ii) 10-100; and (iii) 100-1000. At one extreme, a set of spectral data generated for a cycle of ion analysis may correspond to a single laser pulse and/or a single packet of ions.

The number of laser pulses and/or packets of ions generated for a cycle of ion analysis may be a function of the frequency of the laser pulses and the duration of the cycle of ion analysis. A higher frequency and/or longer duration may tend to provide more laser pulses and/or packets of ions. Thus, the frequency of the laser pulses and/or the duration of the cycle of ion analysis can be selected to achieve a desired number of laser pulses and/or packets of ions to be generated for a cycle of ion analysis.

The area desorbed by a laser pulse and/or to generate a packet of ions may be a function of the area of the focal point, the frequency of the laser pulses and the velocity of the focal point. A larger focal point area, lower frequency and/or higher velocity may tend to increase the area desorbed by a laser pulse and/or to generate a packet of ions. Thus, the area of the focal point, the frequency of the laser pulses and/or the velocity of the focal point may be selected to achieve a desired area to be desorbed by a laser pulse and/or to generate a packet of ions.

The overall area desorbed for a cycle of ion analysis may be a function of the area of the focal point, the velocity of the focal point and the duration of the cycle of ion analysis. A larger focal point area, higher velocity and/or longer duration may tend to increase the area desorbed for a laser pulse and/or packet of ions. Thus, the area of the focal point, the velocity of the focal point and/or the duration of the cycle of ion analysis may be selected to achieve a desired overall area to be desorbed for a cycle of ion analysis. Thus, in embodiments, the overall area desorbed for a cycle of ion analysis may be selected substantially independently of the pulse frequency (which may be substantially constant).

The spectrometer may further comprise an ion inlet arranged and adapted to receive packets of ions generated from the target sample.

The spectrometer may further comprise one or more ion handling devices. The one or more ion handling devices may be selected from the group consisting of: one or more ion guides; one or more ion traps and/or one or more ion trapping regions; one or more mass filters; one or more ion mobility separation devices and/or one or more Field Asymmetric Ion Mobility Separation ("FAIMS") devices; and one or more mass analysers.

The control system may be arranged and adapted to remove residual ions from the spectrometer by applying or removing one or more voltages or potentials to or from one or more electrodes of one or more of the ion handling devices. The control system may be arranged and adapted to remove residual ions from the spectrometer by applying one or more travelling voltage or potential waveforms to one or more electrodes of one or more of the ion handling devices so as to urge or sweep ions out of those one or more ion handling devices.

The control system may be arranged and adapted to generate and/or output an array of pixel elements, wherein each pixel element represents a respective set of spectral data that corresponds to one or more ion packets analysed during a cycle of ion analysis. The control system may be arranged and adapted to generate and/or output an image based on the array of pixel elements.

As discussed above, the spectrometer may comprise one or more collision, fragmentation or reaction cells. The one or more collision, fragmentation or reaction cells may be selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

As discussed above, the spectrometer may comprise one or more mass filters. The one or more mass filters may be selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

As discussed above, the spectrometer may comprise one or more mass analysers. The one or more mass analysers may be selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

The spectrometer, for example the one or more mass analysers, may comprise one or more pusher electrodes and/or one or more ion detectors.

As discussed above, the one or more ion handling devices may comprise one or more electrodes. The spectrometer may comprise a voltage or potential source arranged and adapted to supply one or more voltages or potentials to the one or more electrodes.

The spectrometer may comprise a voltage or potential source arranged and adapted to supply an AC or RF voltage to the one or more electrodes. The AC or RF voltage may have an amplitude selected from the group consisting of: (i)<50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi)>500 V peak to peak. The AC or RF voltage may have a frequency selected from the group consisting of: (i)<100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv)>10.0 MHz.

The spectrometer may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation; a Quantification mode of operation; and/or an Ion Mobility Spectrometry ("IMS") mode of operation.

According to another aspect there is provided a method of mass and/or ion mobility spectrometry comprising:

providing a target sample supported on a sample plate;

providing a laser source arranged and adapted to generate a series of laser pulses;

moving a focal point of the laser source substantially continuously across the sample plate, wherein respective packets of ions are generated by respective laser pulses impinging upon respective locations on the target sample supported on the sample plate; and performing plural cycles of ion analysis, wherein each cycle of ion analysis comprises producing a set of spectral data that corresponds to one or more of the packets of ions.

In embodiments, the method may comprise providing one or more of the features of the mass and/or ion mobility spectrometer as described herein in any aspect or embodiment. In embodiments, the method may comprise performing one or more of the functions that the mass and/or ion mobility spectrometer is arranged and adapted to perform as described herein in any aspect or embodiment.

For example, embodiments may comprise removing residual ions from the spectrometer in between the cycles of ion analysis. For another example, embodiments may comprise gating the series of laser pulses in between the cycles of ion analysis and/or while residual ions are being removed from the spectrometer.

According to an aspect there is provided a mass and/or ion mobility spectrometer comprising:

a sample plate arranged and adapted to support a target sample;

a laser source arranged and adapted to generate a series of laser pulses; and a control system arranged and adapted:

(i) to move a focal point of the laser source substantially continuously across the sample plate, wherein respective packets of ions are generated by respective laser pulses impinging upon respective locations on the target sample supported on the sample plate;

(ii) to cause the laser source to generate a series of laser pulses during a cycle time $T_1$ in respect of a pixel;

(iii) to gate, stop or block the series of laser pulses during a subsequent inter-cycle time period $T_0$ so that substantially no ions or fewer ions are generated during the inter-cycle time period $T_0$; and (iv) to repeat steps (i)-(iii) one or more times.

According to another aspect there is provided a method of mass and/or ion mobility spectrometry comprising:

(i) providing a target sample supported on a sample plate;

(ii) providing a laser source arranged and adapted to generate a series of laser pulses;

(iii) moving a focal point of the laser source substantially continuously across the sample plate, wherein respective packets of ions are generated by respective laser pulses impinging upon respective locations on the target sample supported on the sample plate;

(iv) causing the laser source to generate a series of laser pulses during a cycle time $T_1$ in respect of a pixel;

(v) gating, stopping or blocking the series of laser pulses during a subsequent inter-cycle time period $T_0$ so that substantially no ions or fewer ions are generated during the inter-cycle time period $T_0$; and (vi) repeating steps (iii)-(v) one or more times.

BRIEF DESCRIPTION OF THE DRAWINGS

Various embodiments will now be described, by way of example only, and with reference to the accompanying drawings in which.

DETAILED DESCRIPTION

Various embodiments will now be described in more detail. According to various embodiments, a mass and/or ion mobility spectrometer is provided comprising a laser source that generates a series of laser pulses. The focal point of the laser source is moved substantially continuously across a sample plate such that respective packets of ions are generated by respective laser pulses impinging upon respective locations on a target sample supported on the sample plate.

Providing a laser source that generates a series of laser pulses and moving a focal point of the laser source substantially continuously across the sample plate in this way can help to increase speed and efficiency when generating respective packets of ions from respective locations on a target sample, for example by avoiding the need to decrease the velocity of the focal point substantially to zero at a first sample location, pulse the laser to generate a packet of ions at that first sample location, and then increase the velocity of the focal point again to move to the next sample location, and so on, in a substantially stop-start manner.

Figure 1:
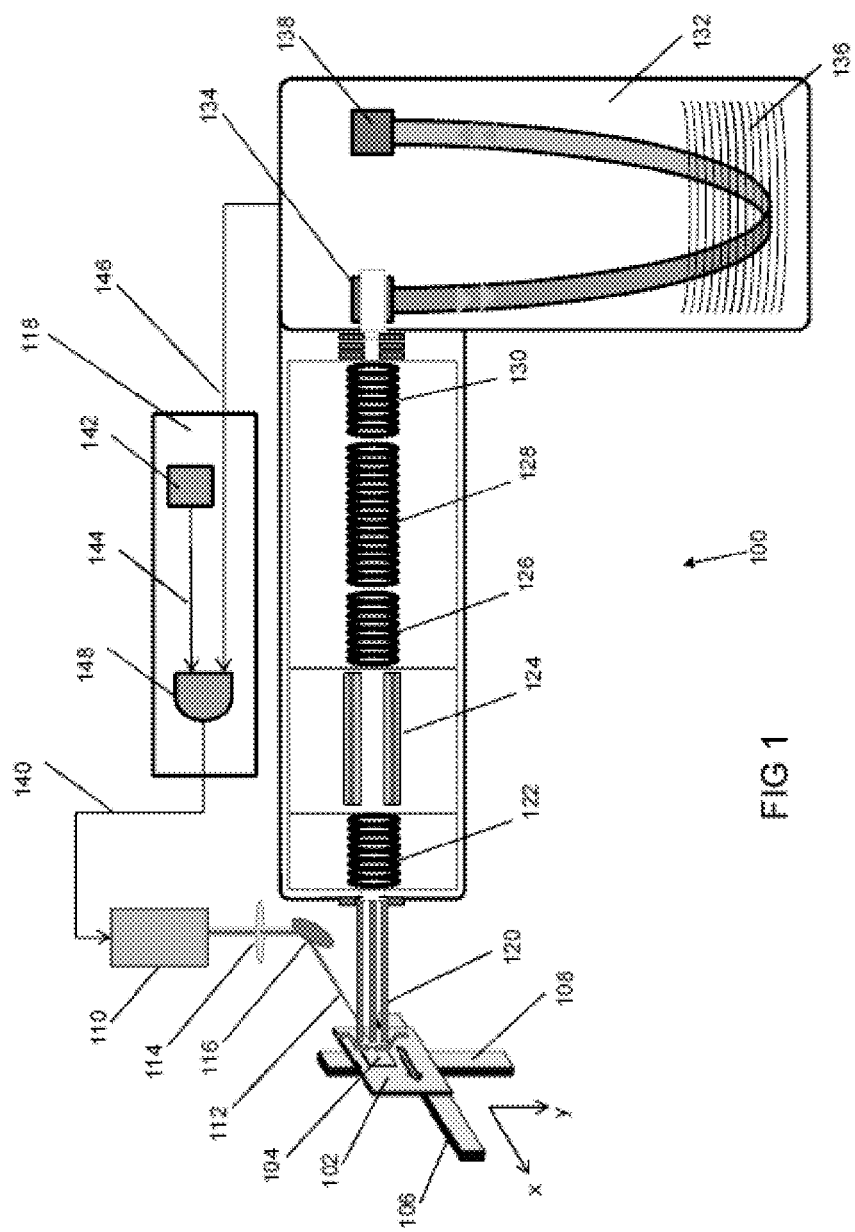
FIG. 1 shows a MALDI mass spectrometer according to an embodiment.

FIG. 1 shows a mass spectrometer 100 according to an embodiment. The spectrometer 100 comprises a metal sample plate 102 that supports a target sample 104. In this embodiment, the target sample 104 comprises a Matrix Assisted Laser Desorption Ionisation ("MALDI") ion source in the form of a sample of biological tissue embedded in an organic solvent matrix material. The sample plate 102 is mounted to a translation stage that comprises first and second orthogonal translation axes 106, 108 that allow the sample plate 102 to be translated in first and second orthogonal (x,y) directions.

The spectrometer 100 further comprises a laser source 110 that generates laser pulses 112. The laser pulses 112 are focused onto and directed towards the sample plate 102 by a lens 114 and mirror 116. In use, the respective laser pulses 112 impinge upon respective locations on the target sample 104 and generate respective packets of analyte ions.

The spectrometer 100 operates under the control of a control system 118. In use, the control system 118 moves the sample plate 102 substantially continuously and at a substantially constant velocity of around 1 mm/s along a scan line in the x-direction, such that respective packets of ions are generated by respective laser pulses impinging upon respective locations on the target sample 104. The control system 118 then moves the sample plate 102 in the y-direction to the next scan line for the next scan in the x-direction. In some embodiments, the control system 118 moves the sample plate 102 along the plural parallel scan lines in a raster pattern (namely, scans each scan line in the same direction), whereas in other embodiments, the control system 118 moves the sample plate 102 along the plural parallel scan lines in a serpentine pattern (namely, scans adjacent scan lines in opposite directions).

For each pixel in a desired output image to be generated for or from the target sample, a respective cycle of ion analysis is performed. For each cycle of ion analysis, and thus for each pixel in the output image, one or more packets of analyte ions are generated by one or more corresponding laser pulses and are drawn into an ion inlet 120 of the spectrometer 100. The one or more packets of ions are then guided through an inlet ion guide 122 to a quadrupole mass filter 124 wherein ions of interest are selected based on mass to charge ratio. The selected ions are then accumulated within an ion trap 126 and the accumulated ions are then released into an ion mobility separator 128 that separates the ions based on ion mobility.

The separated ions are then passed through a transfer ion guide 130 to a Time of Flight ("ToF") mass analyser 132. Pusher electrodes 134 of the mass analyser 132 then deflect the ions through a curved path caused by a reflectron 136 and the intensity profile of the ions is recorded over time using an ion detector 138. The intensity profile comprises mass spectral data corresponding to the one or more packets of ions for the pixel in question. The spectral data for plural pixels can be used to form the image to be output for display.

The inlet ion guide 122, mass filter 124, ion trap 126, ion mobility separator 128, transfer ion guide 130 and mass analyser 132 may be referred to herein collectively as ion handling devices.

In between the cycles of ion analysis, the control system 118 removes residual ions from the spectrometer 100 by applying one or more travelling voltage or potential waveforms to the electrodes of one or more of these ion handling devices, such as the inlet ion guide 122, mass filter 124, ion mobility separator 128 and/or transfer ion guide 130, in order to urge or sweep ions out of that device.

In other embodiments, ions may also or instead be removed by removing one or more trapping voltages or potentials from one or more electrodes, such as of the ion trap 126 or other ion-optical device. This removal of ions can help to reduce or avoid crosstalk between pixels caused by residual ions remaining in the spectrometer 100 from the previous cycle of ion analysis to the next cycle of ion analysis.

In this embodiment, the laser source 110 is instructed to pulse based on a series of control pulses provided by the control system 118 via a connection 140. The series of control pulses is derived from a substantially constant frequency and substantially continuous series of "free-running" control pulses provided by a control pulse source 142 via a connection 144. This use of a substantially constant frequency and substantially continuous series of control pulses, which can be independent of the movement of the sample plate 102, can help to simplify the operation of the spectrometer 100, for example by avoiding the need for complex and/or expensive pulse control circuitry.

In some embodiments, a status signal is also provided to the control system 118 by the mass analyser 132 via a connection 146. During a cycle of ion analysis for a pixel, the status signal on the connection 146 is set to a first or high state (for example, to "1") to indicate that a cycle of ion analysis is in progress. In between cycles of operation, the status signal on the connection 146 is set to a second or low state (for example, to "0") to indicate that a cycle of ion analysis is no longer in progress and that residual ions can be removed from the spectrometer 100.

In some embodiments, the series of control pulses may be gated by performing an AND operation 148 that takes the series of control pulses on the connection 144 and the status signal on the connection 146 as inputs and outputs a gated series of control pulses to the laser source 110 on the connection 140. This electronic gating of the series of control pulses can provide an effective and reliable way to electronically gate the series of laser pulses while the residual ions are being removed from the spectrometer 100 in between cycles of ion analysis.

However, other embodiments are contemplated in which the control system 118 mechanically and/or optically gates the series of laser pulses, for example by blocking and/or deflecting the output of the laser source 110 while residual ions are being removed from the spectrometer in between cycles of ion analysis.

In some embodiments, as will be explained in more detail below, gating the series of laser pulses in between cycles of ion analysis can reduce or avoid crosstalk, for example by avoiding one or more packets of ions being generated and then entering the spectrometer in between cycles of ion analysis. Also, as will be explained in more detail below, gating the series of laser pulses while residual ions are being removed from the spectrometer can increase the number of ions generated for the subsequent cycle of ion analysis and thus increase the sensitivity of the spectrometer.

However, other embodiments are contemplated in which the control system 118 does not gate the series of laser pulses.

FIGS. 2A-2D illustrate a process of ionisation using a series of un-gated laser pulses according to an embodiment.

Figure 2A:
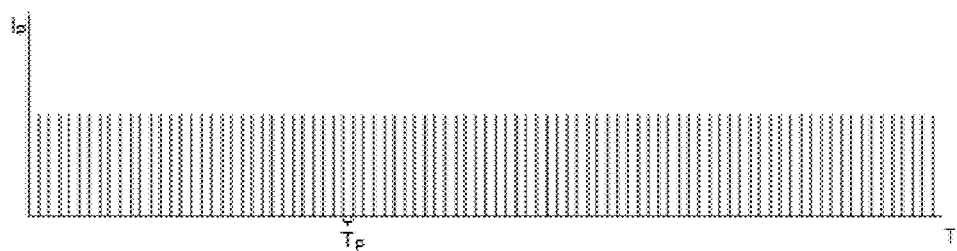
FIG. 2A illustrates a process of ionisation using an un-gated series of laser pulses and shows the intensity of a series of laser pulses over time.
Figure 2B:
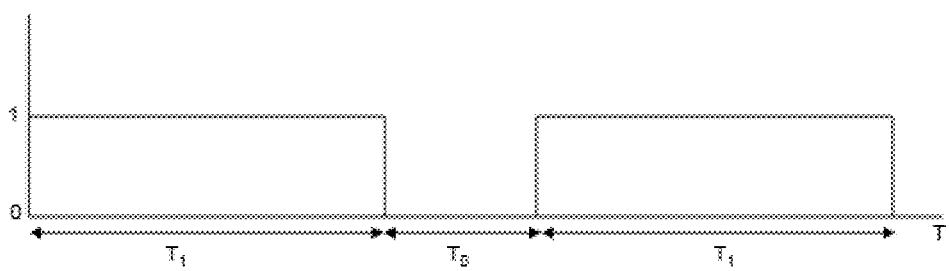
FIG. 2B shows a status signal over time wherein "1" indicates that a cycle of ion analysis is currently being performed and "0" indicates the time between cycles of ion analysis.

FIG. 2A shows the intensity $I_P$ of a series of laser pulses over time T. In this embodiment, the series of laser pulses has a frequency of 1 kHz and thus a period $T_p$ of 1 ms. FIG. 2B shows the status signal over time T, wherein "1" indicates that a cycle of ion analysis is currently being performed in respect of a pixel, and "0" indicates the time between cycles of ion analysis. In this embodiment, each cycle lasts for a cycle time $T_1$ of 35 ms. The inter-cycle time $T_0$ is 15 ms. As discussed above, residual ions can be removed from the spectrometer during the inter-cycle time $T_0$ to avoid crosstalk between pixels.

Figure 2C:
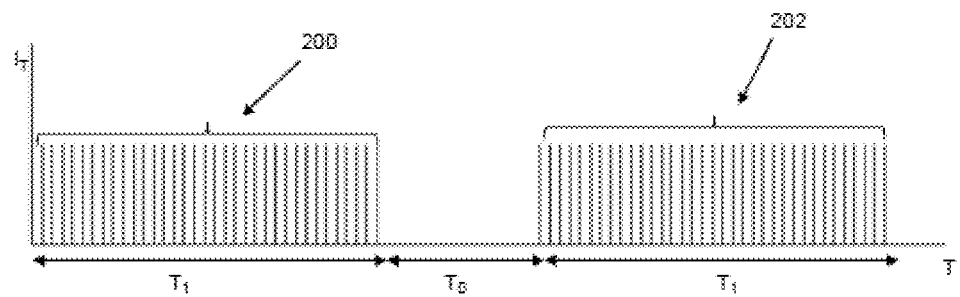
FIG. 2C shows the total intensity of ions for ion packets that reach the ion detector over time and FIG. 2D shows the locations of the target sample for which ion packets are generated and detected over cycle time $T_1$.

FIG. 2C shows the total intensity of ions $I_T$ for the respective ion packets that reach the ion detector over time T. As is shown, a first set of ion packets 200 of substantially the same intensity as each other is received over cycle time $T_1$ for a first pixel. There is then a period of time during which ions are generated, but are immediately removed from the spectrometer over the inter-cycle time $T_0$ such that substantially no ions reach the ion detector. A second set of ion packets 202 of substantially the same intensity is then received over cycle time $T_1$ for a second pixel.

Figure 2D:
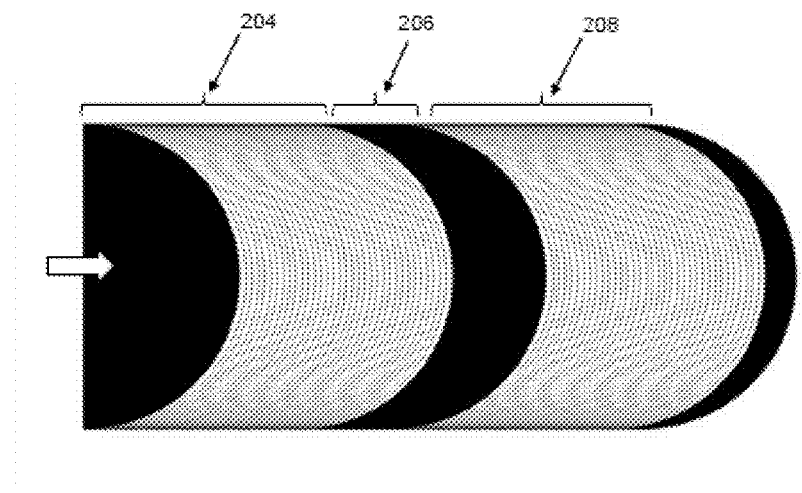

FIG. 2D shows the locations of the target sample for which ion packets are generated and detected over cycle time $T_1$ (shown with lighter shading) and the locations of the target sample for which ion packets are generated but then removed from the spectrometer over cycle time $T_0$ (shown with darker shading) as the focal point of the laser is moved continuously across the target sample.

In FIG. 2D, the focal point of the laser is moved in the direction of the arrow and each partial disc area corresponds to one laser pulse impinging upon a particular location to generate a packet of ions. In this embodiment, the diameter of the focal point of the laser is 10 μm.

As is shown, there is a first set of locations 204 corresponding to the first set of ion packets 200 that are generated and detected over cycle time $T_1$ for the first pixel. There are then some locations 206 for which ions are generated but then removed from the spectrometer over the inter-cycle time $T_0$. There is then a second set of locations 208 corresponding to the second set of ion packets 202 that are generated and detected over cycle time $T_1$ for the second pixel.

In the embodiment shown and described with reference to FIGS. 2A-2D, providing a laser source that generates an un-gated series of laser pulses at a substantially constant frequency and moving a focal point of the laser source substantially continuously across the sample plate can help to increase speed and efficiency when generating respective packets of ions from respective locations on a target sample.

However, in the embodiment shown and described with reference to FIGS. 2A-2D, the ion packets generated during time $T_0$ can still contribute to crosstalk. Furthermore, the ion packets generated during time $T_0$, and thus the target sample desorbed at the set of locations 206, is essentially wasted. This problem becomes worse as the ratio $T_0/T_1$ is increased.

FIGS. 3A-3E illustrate a process of ionisation using a gated series of laser pulses according to an embodiment that reduces crosstalk, avoids wasting target sample and increases sensitivity.

Figure 3A:
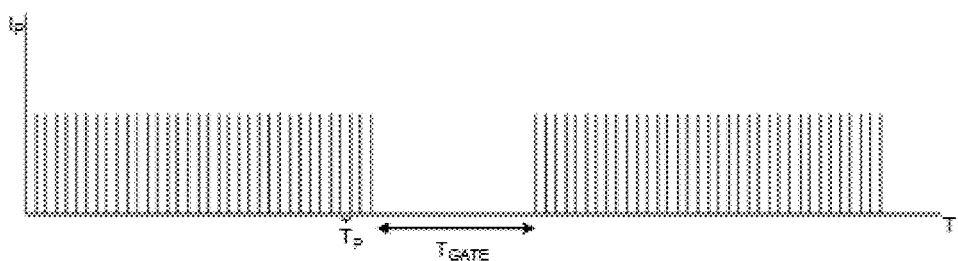
FIG. 3A illustrates a process of ionisation using a gated series of laser pulses according to an embodiment and shows the intensity of a series of laser pulses over time.

FIG. 3A shows the intensity $I_P$ of a series of laser pulses over time T. In this embodiment, the laser pulses have a frequency of 1 kHz and thus a period $T_p$ of 1 ms. However, in contrast to the arrangement shown in FIG. 2A according to this embodiment the series of laser pulses are gated or are periodically stopped or interrupted.

Figure 3B:
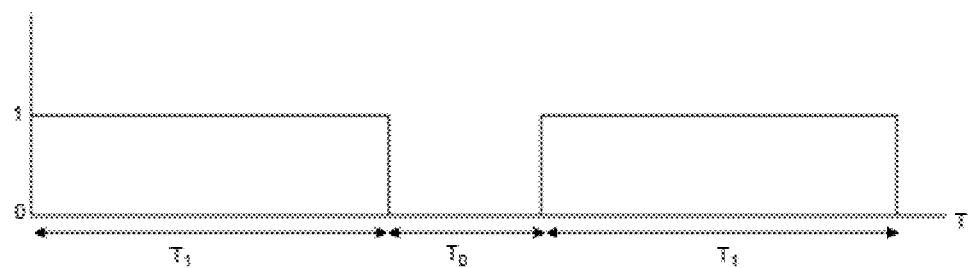
FIG. 3B shows a status signal over time wherein "1" indicates that a cycle of ion analysis is currently being performed and "0" indicates the time between cycles of ion analysis.

FIG. 3B shows the status of the ion analysis over time T, wherein "1" indicates that a cycle of ion analysis is currently being performed in respect of a pixel and "0" indicates the time between cycles of ion analysis. In this embodiment, each cycle lasts for a cycle time $T_1$ of 35 ms and the inter-cycle time $T_0$ is 15 ms. Residual ions may be removed from the spectrometer during the inter-cycle time $T_0$ to avoid crosstalk between pixels. However, in this embodiment, the series of laser pulses is gated or are periodically stopped or interrupted for a time $T_{GATE}$ corresponding to $T_0$. Thus, in this embodiment, $T_{GATE}$ is 15 ms.

Figure 3C:
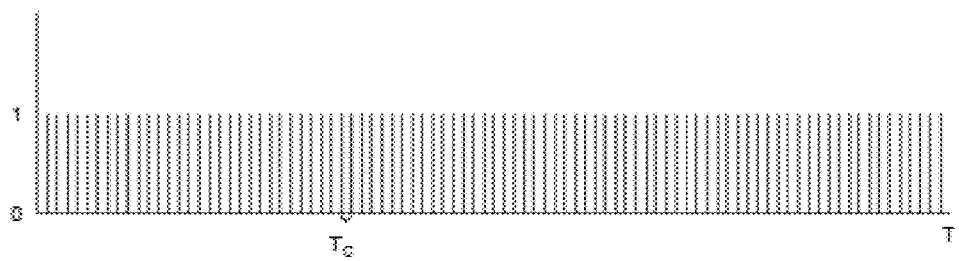
FIG. 3C shows a series of fixed frequency control pulses that were used to generate a series of laser pulses over time.

FIG. 3C shows a series of fixed frequency control pulses that were used to generate the series of laser pulses over time T. In this embodiment, the series of control pulses has a frequency of 1 kHz and thus a period $T_c$ of 1 ms. As discussed above, the series of control pulses may be gated by an AND operation that takes the series of control pulses of FIG. 3C and the status signal of FIG. 3B as inputs and outputs a gated series of control pulses. The gated series of control pulses can then be provided to the laser source to generate the gated series of laser pulses as shown in FIG. 3A.

The gated series of laser pulses helps to reduce crosstalk by avoiding one or more packets of ions being generated and then entering the spectrometer over or during the inter-cycle time $T_0$.

Figure 3D:
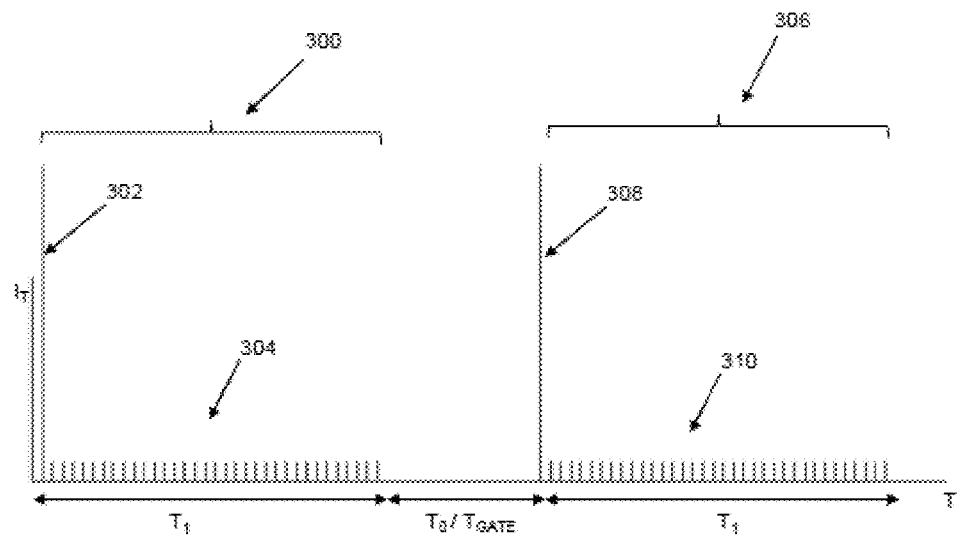
FIG. 3D shows the total intensity of ions for ion packets that reach the ion detector over time and FIG. 3E shows the locations of the target sample for which ion packets are generated and detected over cycle time $T_1$.

FIG. 3D shows the total intensity of ions $I_T$ for the respective ion packets that reach the ion detector over time T. As is shown, a first set of ion packets 300 is received over cycle time $T_1$ for a first pixel. In this embodiment, the first set of ion packets 300 comprises an initial higher intensity ion packet 302. This is because gating the laser pulses has left a larger partial disc area of non-desorbed target sample that can then be desorbed by the initial laser pulse for the first pixel. This is then followed by lower intensity ion packets 304.

There is then a period of time during which the series of laser pulses is gated or periodically stopped or interrupted and thus no ions are generated over or during the inter-cycle time $T_0$. As is shown, a second set of ion packets 306 is then received over cycle time $T_1$ for a second pixel. Again, in this embodiment, the second set of ion packets 306 comprises an initial higher intensity ion packet 308. Again, this is because gating the series of laser pulses has left a larger partial disc area of non-desorbed target sample that can then be desorbed by the initial laser pulse for the second pixel. This is then followed by lower intensity ion packets 310.

Thus, in this embodiment, fewer ions packets are generated and wasted and so the total number of ions generated and received is higher (for example, up to 30% higher) when compared with the embodiment described above with reference to FIGS. 2A-2D. Thus, in this embodiment, the sensitivity of the spectrometer is increased when compared with the embodiment described above with reference to FIGS. 2A-2D.

Figure 3E:
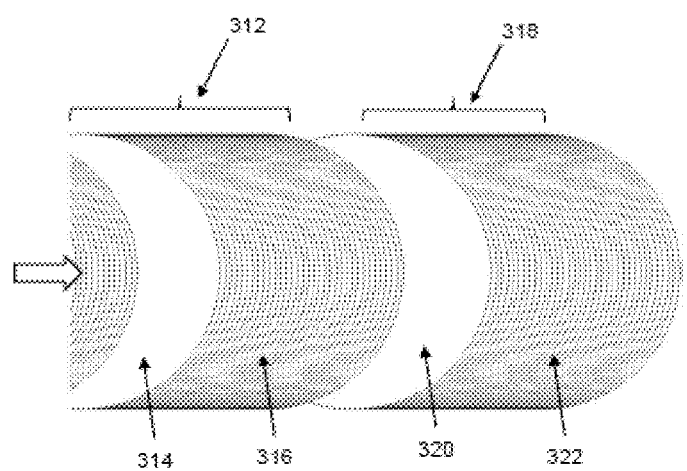

FIG. 3E shows the locations of the target sample for which ion packets are generated and detected over cycle time $T_1$ as the focal point of the laser is moved continuously across the target sample. In FIG. 3E, the focal point of the laser is again moved in the direction of the arrow and each partial disc area corresponds to one laser pulse impinging upon a particular location to generate a packet of ions. In this embodiment, the diameter of the focal point of the laser is again 10 μm.

As is shown, there is a first set of locations 312 corresponding to the first set of ion packets 300 that are generated and detected over cycle time $T_1$ for the first pixel. In this embodiment, the first set of locations 312 comprises a larger partial disc area 314 of non-desorbed target sample that is desorbed by the initial laser pulse to generate the initial ion packet 302 for the first pixel, followed by a set of smaller partial disc areas 316 that are desorbed by the subsequent laser pulses to generate the subsequent ion packets 304 for the first pixel. There is then a second set of locations 318 corresponding to the second set of ion packets 306 that are generated and detected over cycle time $T_1$ for the second pixel. Again, in this embodiment, the second set of locations 318 comprises a larger partial disc area 320 of non-desorbed target sample that is desorbed by the initial laser pulse to generate the initial ion packet 308 for the second pixel, followed by a set of smaller partial disc areas 322 that are desorbed by the subsequent laser pulses to generate the subsequent ion packets 310 for the second pixel.

Thus, in this embodiment, a greater area of the target sample is used and less of the target sample is wasted when compared with the embodiment described above with reference to FIGS. 2A-2D.

FIGS. 4A-4D illustrate another process of ionisation using a gated series of laser pulses according to another embodiment.

FIG. 4A again shows the intensity $I_P$ of a series of laser pulses over time T. However, in this embodiment, shorter bursts 400, 402 of high frequency 10 kHz laser pulses are used.

Figure 4A:
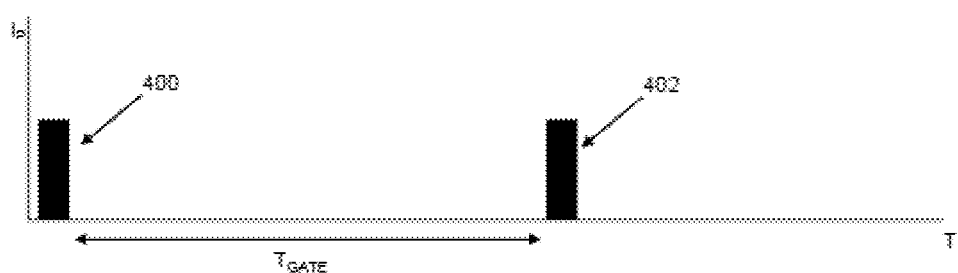
FIG. 4A illustrates a process of ionisation using a gated series of laser pulses according to yet another embodiment and shows the intensity of a series of laser pulses over time.
Figure 4B:
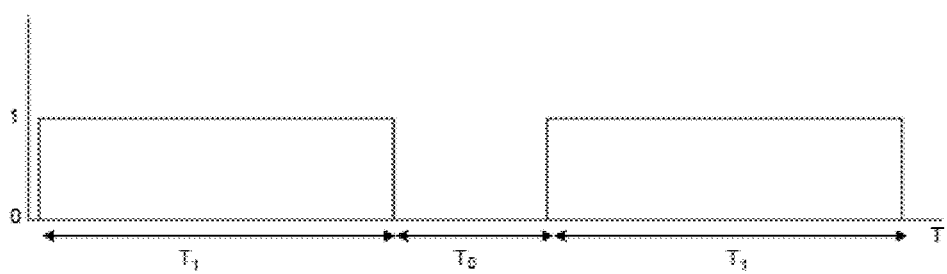
FIG. 4B shows a status signal over time wherein "1" indicates that a cycle of ion analysis is currently being performed and "0" indicates the time between cycles of ion analysis.

FIG. 4B shows the status of the ion analysis over time T, wherein "1" indicates that a cycle of ion analysis is currently being performed in respect of a pixel, and "0" indicates the time between cycles of ion analysis. In this embodiment, each cycle again lasts for a cycle time $T_1$ of 35 ms and the inter-cycle time $T_0$ is 15 ms. Residual ions are removed from the spectrometer during the inter-cycle time $T_0$ to avoid crosstalk between pixels. However, in this embodiment, the series of laser pulses is gated for a much longer time $T_{GATE}$. In this embodiment, $T_{GATE}$ is 47 ms, which means that each burst lasts 3 ms and comprises 30×0.1 ms laser pulses. Thus, in this embodiment, $T_{GATE}$ still covers, but is much larger than, the inter-cycle time $T_0$.

Figure 4C:
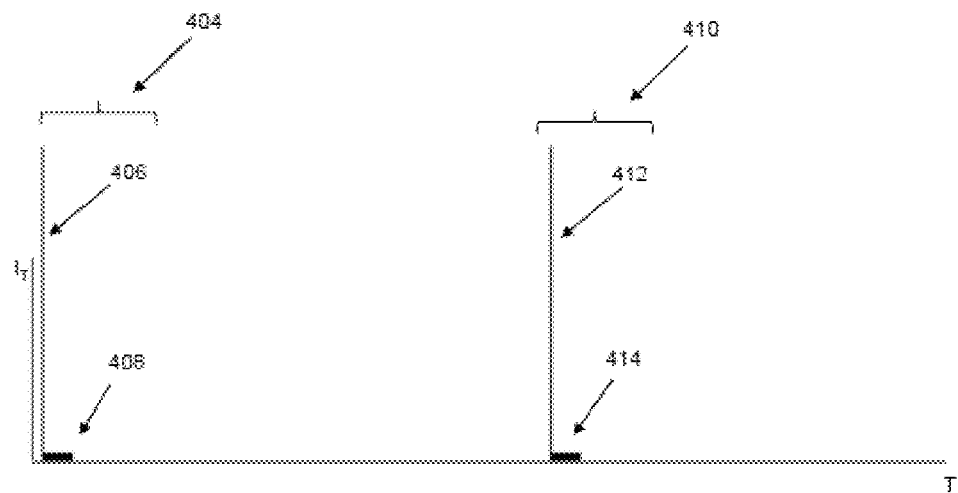
FIG. 4C shows the total intensity of ions for ion packets that reach the ion detector over time and FIG. 4D shows the locations of the target sample for which ion packets are generated and detected as the focal point of the laser is moved continuously across the target sample.

FIG. 4C shows the total intensity of ions $I_T$ for the respective ion packets that reach the ion detector over time T. As is shown, a first set of ion packets 404 is received for a first pixel. In this embodiment, the first set of ion packets 404 comprises an initial even higher intensity ion packet 406. This is because the larger $T_{GATE}$ means that an even larger partial disc area of non-desorbed target sample is desorbed by the initial laser pulse for the first pixel. This is then followed by even lower intensity ion packets 408. This is because the higher frequency of the laser pulses means that the newly desorbed partial disc areas for the subsequent pulses are smaller. There is then a longer period of time $T_{GATE}$ during which the series of laser pulses is gated and thus no ions are generated. As is shown, a second set of ion packets 410 is then received for a second pixel. Again, in this embodiment, the second set of ion packets 410 comprises an initial even higher intensity ion packet 412. Again, this is because the larger $T_{GATE}$ means that an even larger partial disc area of non-desorbed target sample is desorbed by the initial laser pulse for the second pixel. This is again followed by even lower intensity ion packets 414. Again, this is because the higher frequency of the laser pulses means that the newly desorbed partial disc areas for the subsequent pulses are smaller.

Thus, in this embodiment, as with FIGS. 3A-3D, fewer packets of ions are generated and wasted and so the number of ions generated and received is higher when compared with the process of FIGS. 2A-2D. Thus, in this embodiment, as with FIGS. 3A-3D, the sensitivity of the spectrometer is increased when compared with the process of FIGS. 2A-2D.

Figure 4D:
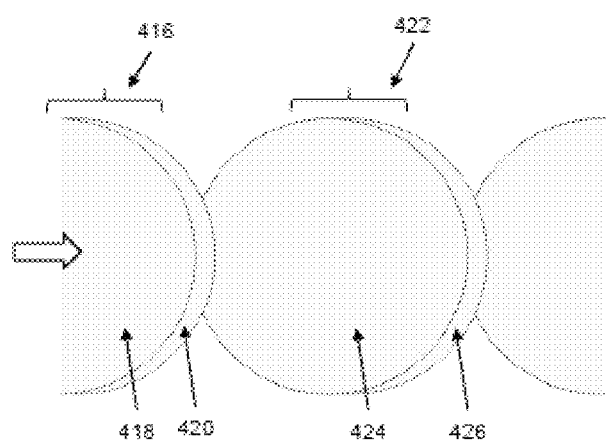

FIG. 4D shows the locations of the target sample for which ion packets are generated and detected as the focal point of the laser is moved continuously across the target sample. In FIG. 4D, the focal point of the laser is moved in the direction of the arrow and each partial disc area corresponds to one laser pulse impinging upon a particular location to generate a packet of ions. In this embodiment, the diameter of the focal point of the laser is again 10 μm.

As is shown, there is a first set of locations 416 corresponding to the first set of ion packets 404 that are generated and detected over cycle time $T_1$ for the first pixel. In this embodiment, the first set of locations 416 comprises an even larger partial disc area 418 of non-desorbed target sample that is desorbed by the initial laser pulse for the first pixel, followed by a set of smaller partial disc areas 420 that are desorbed by the subsequent laser pulses. There is then a second set of locations 422 corresponding to the second set of ion packets 410 that are generated and detected over cycle time $T_1$ for the second pixel. Again, in this embodiment, the second set of locations 422 comprises an even larger partial disc area 424 of non-desorbed target sample that is desorbed by the initial laser pulse for the second pixel, followed by a set of smaller partial disc areas 426 that are desorbed by the subsequent laser pulses.

Thus, in this embodiment, as with FIGS. 3A-3D, a greater area of the target sample is used and less of the target sample is wasted when compared with the process of FIGS. 2A-2D. Furthermore, in this embodiment, there is less overlap between the respective sets of locations from which packets of ions are generated for the respective pixels.

Figure 5A:
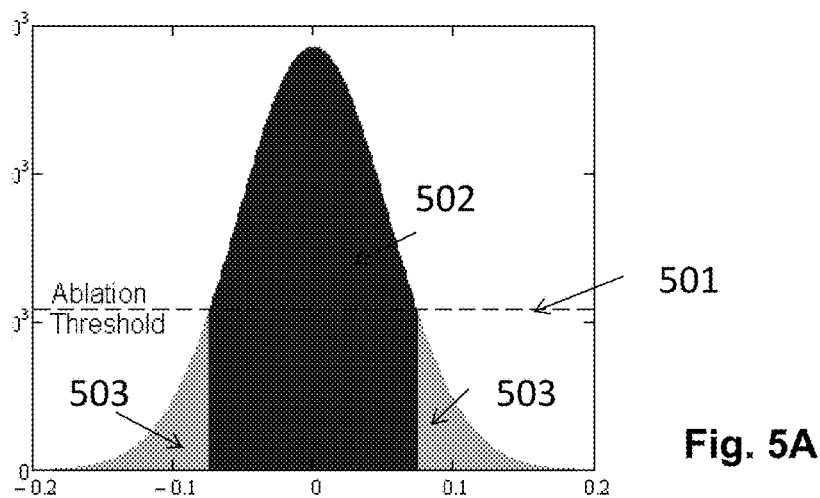
FIG. 5A illustrates a plot of the profile of the optical intensity of the focal point of a laser source according to an embodiment, the profile including an ablation region and a nominally heated region

FIG. 5A illustrates a plot of the profile of the laser intensity of the focal point of the laser source against displacement from the centre of the focal point according to an embodiment.

In embodiments, a region of the focal point that has a laser intensity above an ablation threshold 501 corresponds to an ablation region 502 and a region of the focal point that has a laser intensity below the ablation threshold 501 corresponds to a nominally heated region 503.

The ablation region 502 corresponds to a region in which ions may be generated from a corresponding region of the target sample by the laser source. The nominally heated region 503 corresponds to a region in which the laser source provides thermal power to a corresponding region of a target sample but does not generate ions from that corresponding region of the target sample or generates relatively few ions therefrom compared to the region of the sample that corresponds to the ablation region 502. The laser intensity may be the optical power per unit area of the laser beam or the optical power per unit volume of the laser beam.

Figure 5B:
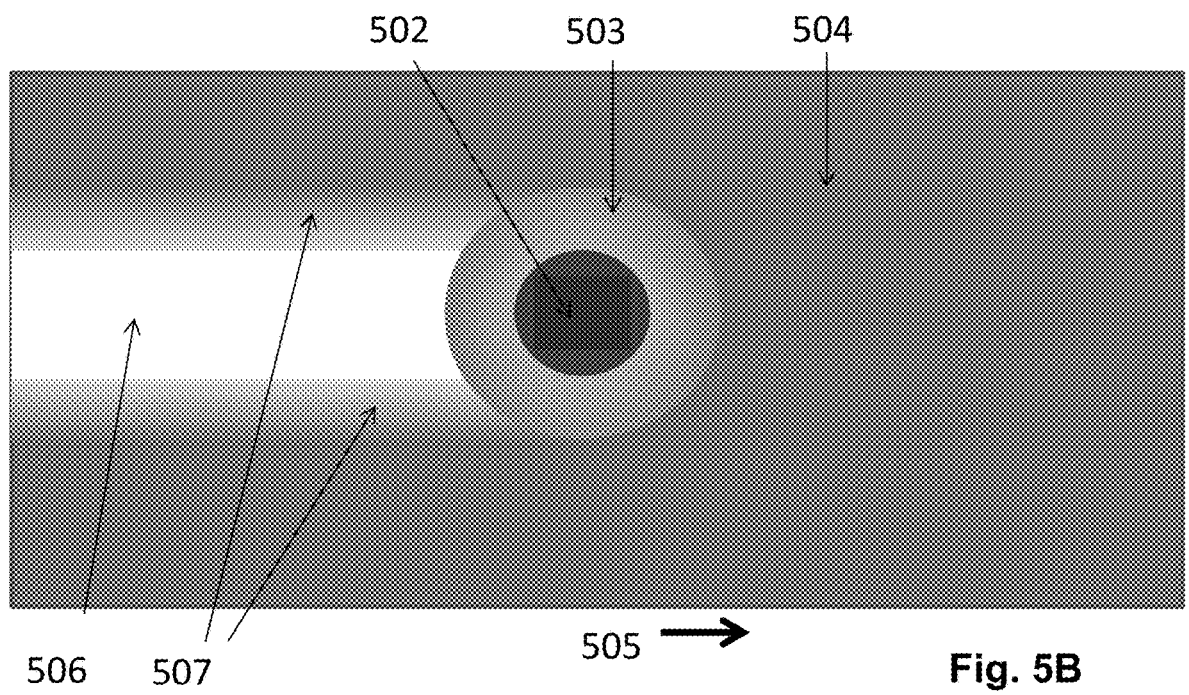
FIG. 5B illustrates the focal point of the laser moving in a direction across the target sample according to an embodiment.

FIG. 5B illustrates the focal point of the laser moving in a direction 505 across the target sample 504 according to an embodiment. In the embodiment of FIG. 5B, the laser source is pulsed continuously. A sample ablation region 506 of the target sample 504 is a region wherein the ablation region 502 of the focal point has passed over. A sample nominally heated region 507 of the target sample is a region wherein the nominally heated region 503 of the focal point has passed over.

In the sample nominally heated region 507, the thermal power provided by the laser source may cause increased sublimation of a material, such as a matrix material, of the target sample 504 in this region. For example, the target sample 504 may comprise a matrix material which has a relatively high volatility, such as 2',6'-Dihydroxyacetophenone ("DHA") and the thermal power provided by the laser source to the sample nominally heated region 507 may rapidly cause the matrix material to sublimate from the target sample in the sample nominally heated region 507. Sublimation of a matrix material from the target sample 504 in the sample nominally heated region 507 may cause the number and/or size of packets of ions that it is possible to acquire from that region of the target sample to be reduced. This can reduce the sensitivity of the spectrometry and cause a reduction in signal intensity for that region. In addition, sublimation of the matrix material may contaminate ion optics.

As the nominally heated region 503 of the focal point precedes the ablation region 502 in passing over regions of the target sample 504 as the focal point moves substantially continuously across the target sample 504, regions of the target sample 504 may be subjected to thermal power from the laser source prior to being subjected to sufficient laser intensity to cause the generation of ions. As a result, particularly in embodiments where the laser is pulsed in between cycles of ion analysis, regions of the target sample may be subjected to thermal preheating and may experience increased sublimation of a matrix material prior to those regions then being subjected to ion generation in a subsequent cycle of ion analysis.

It has therefore been recognised that where the target material comprises a matrix material that has a relatively high volatility, continuing to pulse the laser in between cycles of ion analysis can cause reduced sensitivity and reduced signal intensity.

Figure 6:
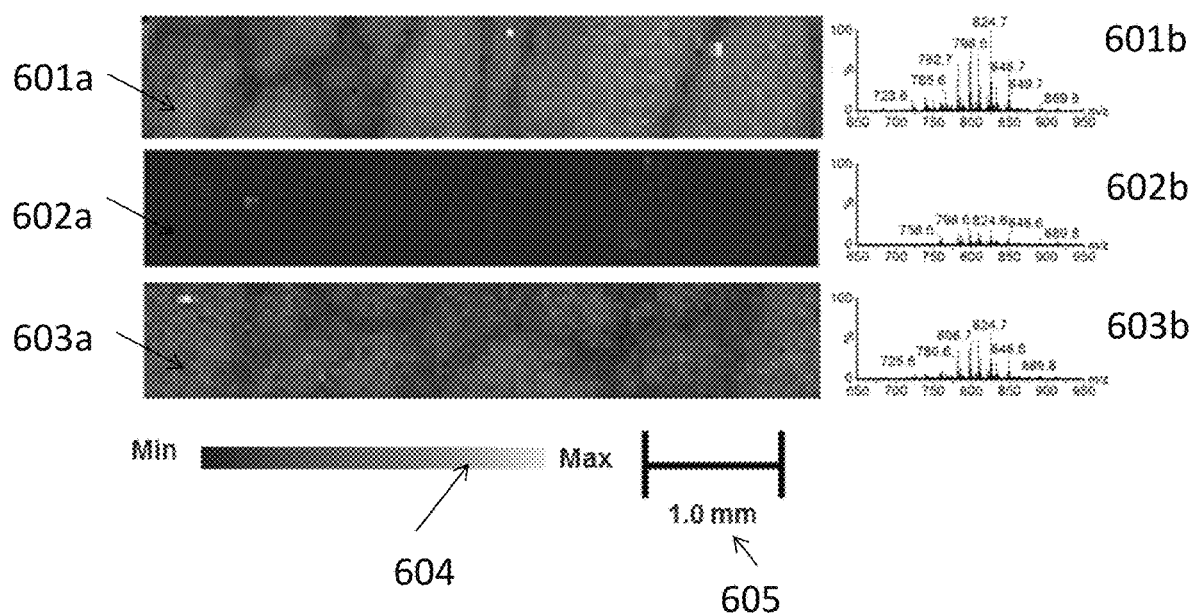
FIG. 6 shows summed spectra and MALDI-MSI images of a liver sample acquired using stationary, continuous raster and gated laser continuous raster modes of operation and illustrates how embodiments are particularly useful when seeking to analyse samples comprising a matrix which may have a relatively high volatility.

FIG. 6 shows summed spectra and MALDI-MSI images of a liver sample using 2',6'-Dihydroxyacetophenone ("DHA") as a matrix material and which has a relatively high volatility.

Image 601a and corresponding mass spectrum 601b were acquired using a stationary mode of operation (which is outside the scope of the present invention) wherein the focal point of the laser source was not moved continuously across the sample plate but was instead moved discretely to each position within a raster pattern in a stop-start manner. The scan time for the stationary mode of operation was 35 ms/pixel.

Image 602a and corresponding mass spectrum 602b were acquired using a continuous raster mode of operation in which the focal point of the laser source was moved substantially continuously across the sample plate in a raster pattern and the laser source was pulsed continuously without gating.

Image 603a and corresponding mass spectrum 603b were acquired using a gated laser continuous raster mode of operation in which the focal point of the laser source was moved substantially continuously across the sample plate in a raster pattern and the laser source was gated in between cycles of ion analysis.

In both the continuous raster mode of operation and gated laser continuous raster mode of operation the acquisition was performed at 20 scans per second and the interscan delay was 15 ms, giving a scan time of 35 ms/pixel.

Image intensity scale bar 604 and spatial scale bar 605 are common to each image 601a, 602a, 603a.

Each of the spectra 601b, 602b, 603b are plotted to the same scale on their respective signal intensity axes.

In all cases a mass to charge ratio value of 832.6 was selected and the pixel size was 50 µm×50 µm.

As seen in FIG. 6, while the continuous raster mode of operation without gating of the laser source may, in embodiments, be advantageous over the stationary mode of operation when quick and efficient mass and/or ion mobility spectrometry is desired, the continuous raster mode of operation (without gating of the laser source) showed a reduction in signal intensity compared to the stationary mode of operation when using volatile 2',6'-Dihydroxyacetophenone ("DHA") as a matrix material.

However, as also seen in FIG. 6, the gated laser continuous raster mode showed an increase in signal intensity compared to the continuous raster mode of operation where the laser source was not gated. It is believed that this increase in signal intensity results from the effects described in relation to FIG. 5B. The relative reduction in signal intensity between the continuous raster and stationary modes of operation may be lessened or negated for samples that have a relatively low volatility.

Accordingly, moving the focal point of the laser source substantially continuously and gating the series of laser pulses in between the cycles of ion analysis and/or while the residual ions are being removed from the spectrometer may, in embodiments, be particularly suitable for samples comprising a material, such as a matrix material, that has a relatively high volatility. Moving the focal point of the laser source substantially continuously and gating the series of laser pulses in between the cycles of ion analysis and/or while the residual ions are being removed from the spectrometer can, in embodiments, provide quick and efficient mass and/or ion mobility spectrometry with relatively high signal intensity and sensitivity.

Although the present invention has been described with reference to various embodiments, it will be understood by those skilled in the art that various changes in form and detail may be made without departing from the scope of the invention as set forth in the accompanying claims.

The invention claimed is:

1. A mass and/or ion mobility spectrometer comprising:
a sample plate arranged and adapted to support a target sample;
a laser source arranged and adapted to generate a series of laser pulses; and
a control system arranged and adapted to:
move a focal point of the laser source substantially continuously across the sample plate, wherein respective packets of ions are generated by respective laser pulses impinging upon respective locations on the target sample supported on the sample plate; and
perform plural cycles of ion analysis, wherein each cycle of ion analysis is performed for a pixel in an output image and comprises producing a set of spectral data that corresponds to one or more of the packets of ions;
wherein the control system is arranged and adapted to gate, stop or block the series of laser pulses in between cycles of ion analysis for two adjacent pixels.

2. A spectrometer as claimed in claim 1, wherein the control system is arranged and adapted to remove residual ions from the spectrometer in between the cycles of ion analysis.

3. A spectrometer as claimed in claim 1, wherein the laser source is arranged and adapted to generate the series of laser pulses based on a series of control pulses.

4. A spectrometer as claimed in claim 3, wherein the series of control pulses is generated and/or received by the control system at a substantially constant frequency over the plural cycles of ion analysis.

5. A spectrometer as claimed in claim 3, wherein the series of control pulses is generated and/or received by the control system substantially continuously over the plural cycles of ion analysis.

6. A spectrometer as claimed in claim 3, wherein the control system is arranged and adapted to gate, stop or block the series of control pulses in between cycles of ion analysis and/or while residual ions are being removed from the spectrometer so as to generate a gated series of control pulses that are provided to the laser source.

7. A spectrometer as claimed in claim 6, wherein the control system is arranged and adapted to gate, stop or block the series of control pulses based on a status signal that indicates whether or not a cycle of ion analysis and/or residual ion removal is currently being performed.

8. A spectrometer as claimed in claim 7, wherein gating the series of control pulses comprises an AND operation that takes the series of control pulses and the status signal as inputs and outputs a gated series of control pulses to the laser source.

9. A spectrometer as claimed in claim 1, wherein the control system is arranged and adapted to scan the focal point of the laser source across the sample plate at a substantially constant velocity over the plural cycles of ion analysis.

10. A spectrometer as claimed in claim 1, wherein the spectrometer further comprises one or more ion handling electrodes.

11. A spectrometer as claimed in claim 10, wherein the control system is arranged and adapted to remove residual ions from the spectrometer by applying or removing one or more voltages or potentials to or from the one or more ion handling electrodes.

12. A spectrometer as claimed in claim 10, wherein the control system is arranged and adapted to remove residual ions from the spectrometer by applying one or more travelling voltage or potential waveforms to the one or more ion handling electrodes so as to urge or sweep ions away from the one or more ion handling electrodes.

13. A method of mass and/or ion mobility spectrometry comprising:
providing a target sample supported on a sample plate;
providing a laser source arranged and adapted to generate a series of laser pulses;
moving a focal point of the laser source substantially continuously across the sample plate, wherein respective packets of ions are generated by respective laser pulses impinging upon respective locations on the target sample supported on the sample plate; and
performing plural cycles of ion analysis, wherein each cycle of ion analysis is performed for a pixel in an output image and comprises producing a set of spectral data that corresponds to one or more of the packets of ions;

wherein the series of laser pulses are gated, stopped or blocked in between cycles of ion analysis for two adjacent pixels.

14. A mass and/or ion mobility spectrometer comprising:
a sample plate arranged and adapted to support a target sample;
a laser source arranged and adapted to generate a series of laser pulses; and
a control system arranged and adapted:
(i) to move a focal point of the laser source substantially continuously across the sample plate, wherein respective packets of ions are generated by respective laser pulses impinging upon respective locations on the target sample supported on the sample plate;
(ii) to cause the laser source to generate a series of laser pulses during a cycle time $T_1$ in respect of a pixel;
(iii) to gate, stop or block the series of laser pulses during a subsequent inter-cycle time period $T_0$ so that substantially no ions or fewer ions are generated during the inter-cycle time period $T_0$; and
(iv) to repeat steps (i)-(iii) one or more times such that, while the focal point of the laser source is being moved substantially continuously in between respective locations on the target sample for two adjacent pixels, the series of laser pulses are gated, stopped or blocked during the inter-cycle time period $T_0$ in between the cycle times $T_1$ for the two adjacent pixels.

15. A method of mass and/or ion mobility spectrometry comprising:
(i) providing a target sample supported on a sample plate;
(ii) providing a laser source arranged and adapted to generate a series of laser pulses;
(iii) moving a focal point of the laser source substantially continuously across the sample plate, wherein respective packets of ions are generated by respective laser pulses impinging upon respective locations on the target sample supported on the sample plate;
(iv) causing the laser source to generate a series of laser pulses during a cycle time $T_1$ in respect of a pixel;
(v) gating, stopping or blocking the series of laser pulses during a subsequent inter-cycle time period $T_0$ so that substantially no ions or fewer ions are generated during the inter-cycle time period $T_0$; and
(vi) repeating steps (iii)-(v) one or more times such that, while the focal point of the laser source is moving substantially continuously in between respective locations on the target sample for two adjacent pixels, the series of laser pulses are gated, stopped or blocked during the inter-cycle time period $T_0$ in between the cycle times $T_1$ for the two adjacent pixels.

* * * * *